J. LARRABURU.
BAKING OVEN.
APPLICATION FILED APR. 8, 1916.
1,206,118.
Patented Nov. 28, 1916.
4 SHEETS—SHEET 1.
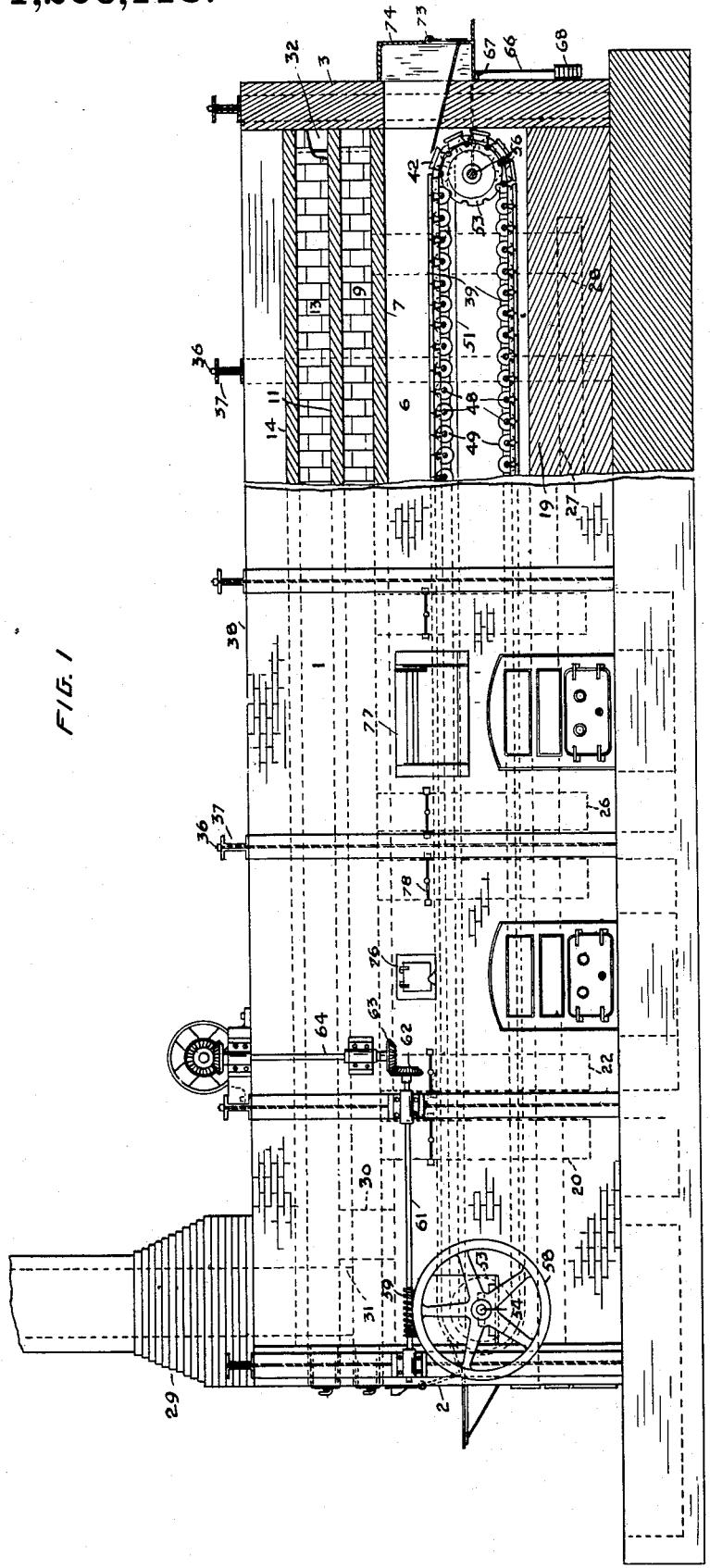
INVENTOR
J. LARRABURU
BY
Fm. Wright
ATTY.

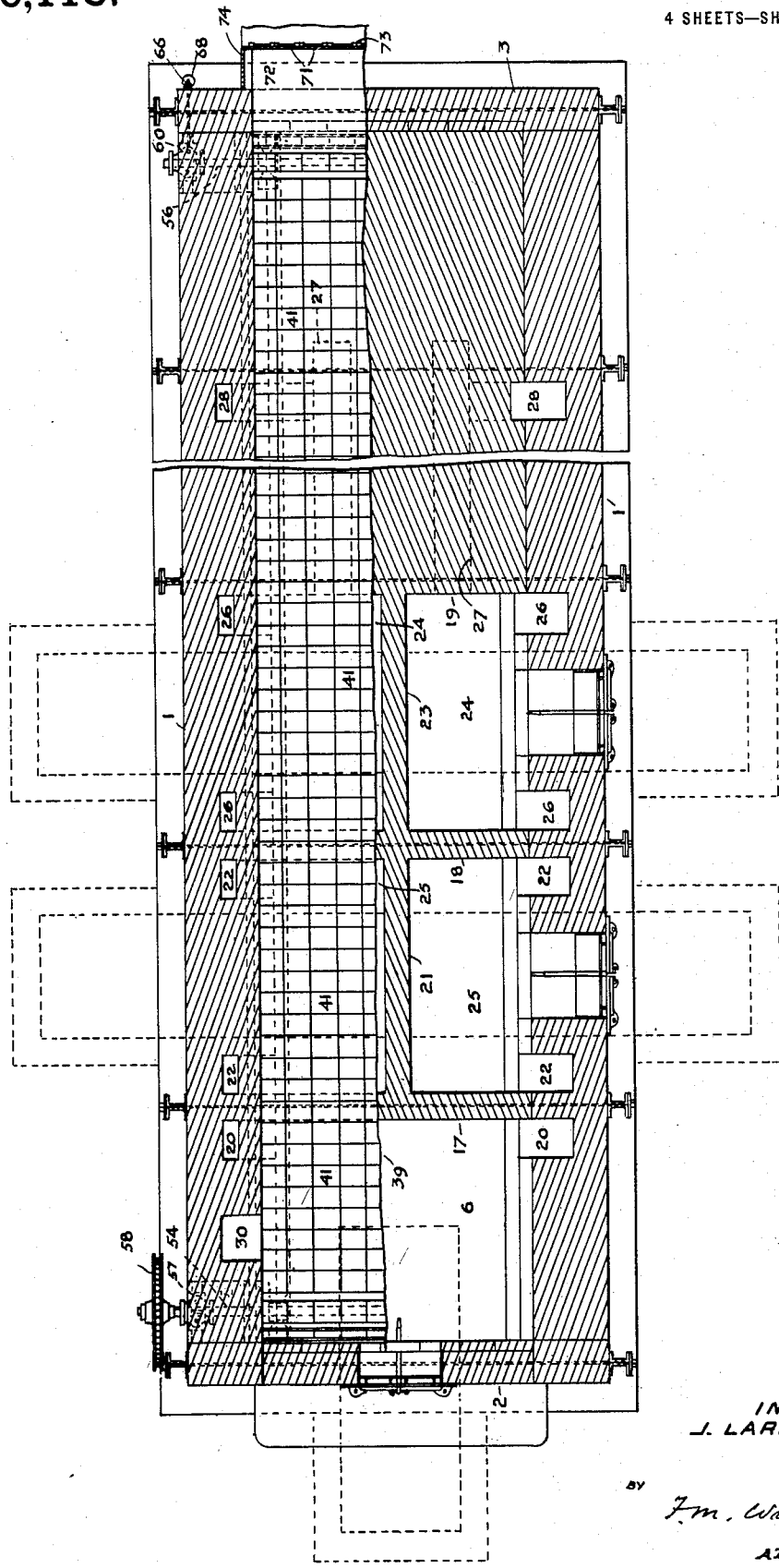

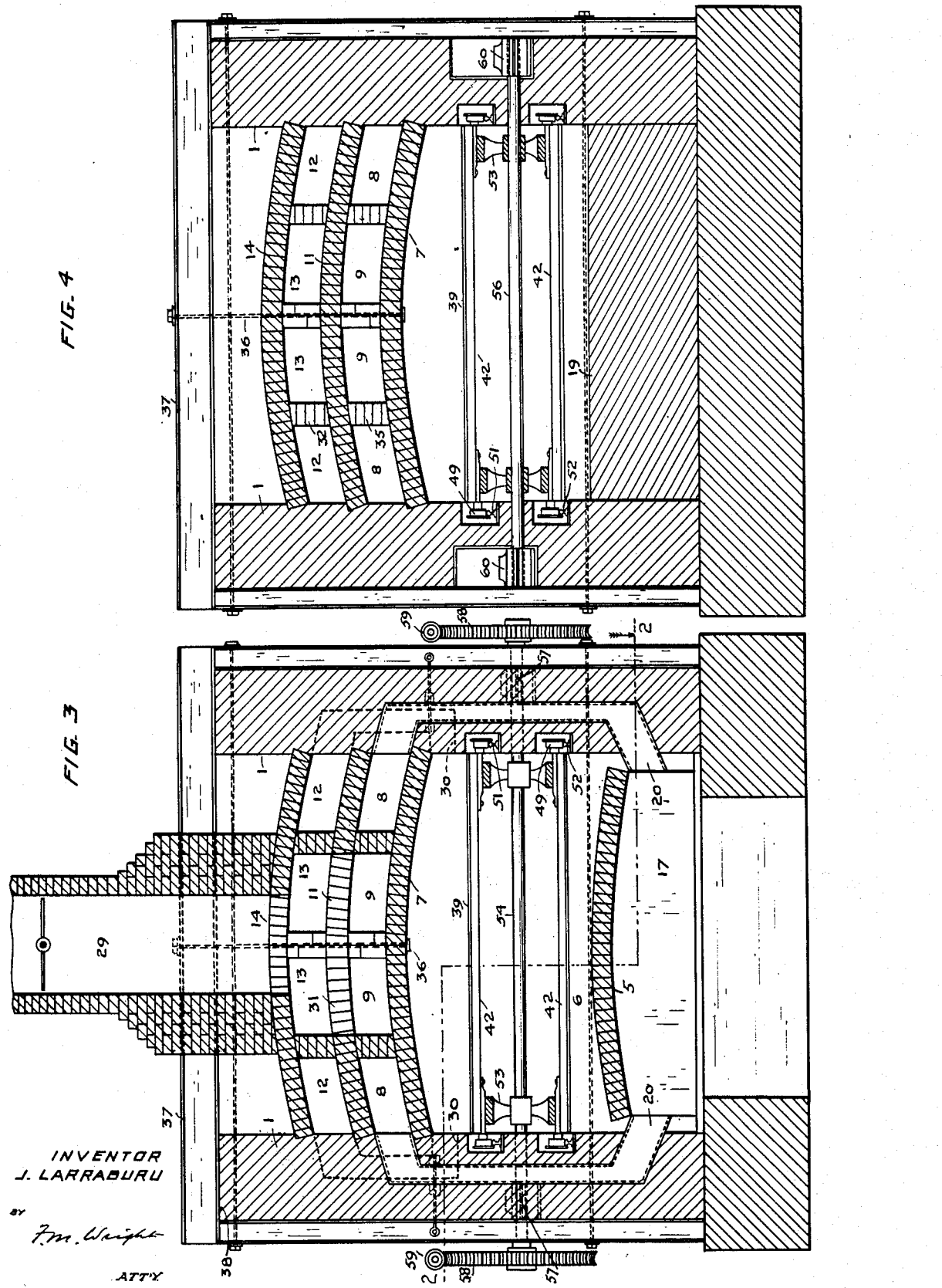

J. LARRABURU.
BAKING OVEN.
APPLICATION FILED APR. 8, 1916.
1,206,118.
Patented Nov. 28, 1916.
4 SHEETS—SHEET 4.
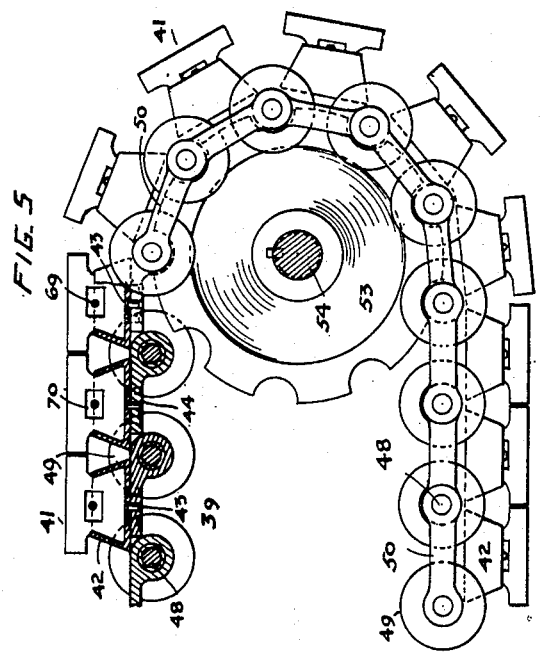
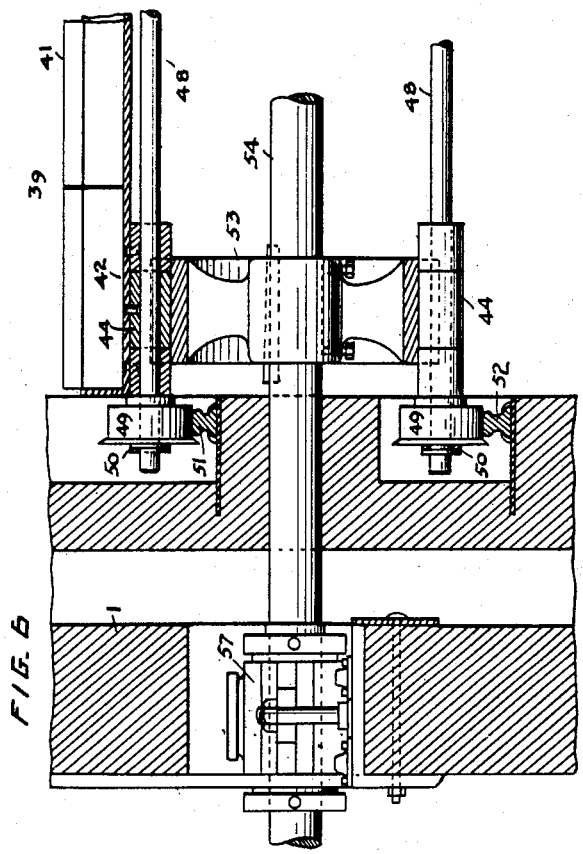
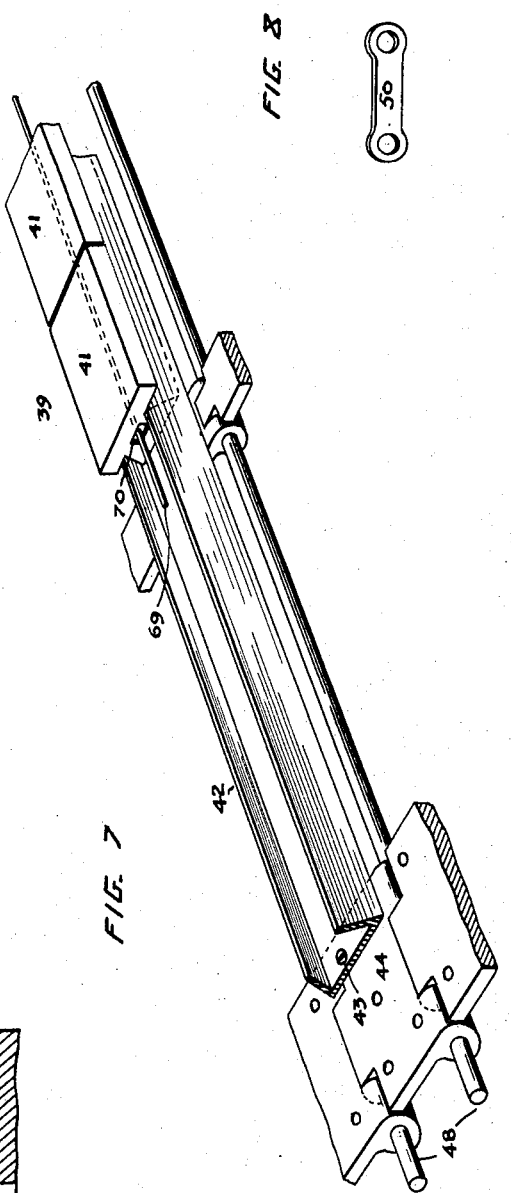
INVENTOR
J. LARRABURU
by F. M. Wright
ATTY.

UNITED STATES PATENT OFFICE.

JOHN LARRABURU, OF SAN FRANCISCO, CALIFORNIA.

BAKING-OVEN.

1,206,118. Specification of Letters Patent. Patented Nov. 28, 1916.

Application filed April 8, 1916. Serial No. 89,910.

*To all whom it may concern:*

Be it known that I, JOHN LARRABURU, a citizen of the United States, residing at San Francisco, in the county of San Francisco and State of California, have invented new and useful Improvements in Baking-Ovens, of which the following is a specification.

My invention relates to improvements in baking ovens, in which is employed a movable floor upon which the dough is placed at one end and from which the loaves are discharged at the other end, and the object of the invention is to provide an oven of this character having flues well adapted to conserve the heat of the fuel, and to withdraw the gases from the baking chamber, and in which the movable parts shall be devised and arranged to economize in power.

Further advantages of the invention will appear from the following description thereof.

In the accompanying drawing, Figure 1 is a side elevation of my improved baking oven, certain parts being shown in section; Fig. 2 is a horizontal section of the same on the line 2—2 of Fig. 3; Fig. 3 is a vertical transverse section through the front of the oven; Fig. 4 is a similar section through the rear of the oven; Fig. 5 is an enlarged broken side view of the movable platform; Fig. 6 is a sectional view of the same and of a part of the oven adjacent thereto; Fig. 7 is a broken perspective view of a brick carrier detached; Fig. 8 is a perspective view of a link.

Referring to the drawing, 1 indicates the side walls, 2 the front wall and 3 the rear wall of a baking oven. Said side walls are connected with each other by a lower arch 5, forming the bottom of the baking chamber 6, an upper arch 7 forming the top of said chamber and the bottoms of longitudinal flues 8 and 9, an arch 11 forming the tops of said flues 8 and 9 and the bottoms of longitudinal flues 12 and 13, and an arch 14 forming the tops of said flues 12 and 13. Said arches 11 and 14 are additionally supported by means of tie-bolts 36 depending from channel-irons 37 resting upon the top 38 of the oven.

Below the arch 5 are transverse vertical walls 17, 18, the transverse wall 17 forming with the front wall of the oven a furnace from which flues 20 extend upwardly in the side walls 1 of the oven. The walls 17 and 18 are connected by a longitudinally extending wall 21, forming with said walls 17 and 18 two auxiliary side furnaces 25 from each of which there extends upwardly flues 22 in the adjacent side wall of the oven. In like manner the wall 18 is connected with the solid rear part 19 of the oven below the arch 5 by a longitudinally extending wall 23, forming two auxiliary furnaces 24, from each of which there extend flues 26, in the adjacent side wall 1 of the oven, while from each a flue 27 extends in the solid part 19 to a point near the other end of the oven, there extending from said flue 27, at intervals thereof, flues 28 in the side walls 1 of the oven, one only being here shown. All of said flues 20, 22, 26, 28 lead to the outer longitudinal flues 8 above the arch 7, connected at the rear end of the oven, as shown at 35, with the inner longitudinal flues 9, which lead to the front end of the oven and which communicate, as shown at 31, with a chimney 29.

The oven exhaust flues 30 lead from the baking chamber 6 at its front into the longitudinal flues 12 at the side and connect at the rear of the oven, as shown at 32, with longitudinal flues 13 which communicate, as shown at 33, with the chimney 29.

39 is a movable oven floor formed of bricks 41 of special construction carried in brick carriers 42 which extend transversely the full width of the baking chamber, and are channel-shaped in form, the sides of the carriers being inclined outwardly toward each other to hold the bricks firmly in place, the inner portions of the bricks being dove-tailed in form to be securely held in said carriers. The bricks are inserted in said carriers at the ends, and, in case of the necessity of repair of the bricks, the carriers are moved out of the baking chamber to enable the bricks to be withdrawn. The central and terminal portions of said carriers 42 are riveted, as shown at 43, to hinge members 44, which are hinged together by means of shafts 48, said shafts being connected to each other by links 50 and supported in rollers 49, which roll upon upper and lower longitudinally extending rails 51, 52. In the front and rear of the baking chamber there are sprocket wheels 53 mounted on a front shaft 54 and a rear shaft 56, the recesses in the peripheries of which sprocket wheels receive said shafts 48. The shafts 54, 56 rotate in boxes 57, 60 in recesses in the side walls of the furnace and the front shaft 54 carries on its ends worm wheels 58 driven by screws 59 on shafts 61 carrying bevel gears 62 meshing with bevel gears 63 on a shaft 64 driven by a motor, not shown, conveniently located, as upon the top of the oven. The boxes 60 for the rear shaft 56 are drawn rearwardly by cables 66 passing over suitably mounted pulleys 67 and supporting weights 68.

Each brick is formed at its ends with recesses 70 to receive cementitious material, by which bricks in the same brick carrier are caused to adhere to each other, and said bricks have each a hole extending longitudinally therethrough, through which hole is a bar 69 for tying all the bricks together.

At the rear end of the oven are a number, say twelve, of small doors 71, hinged, as shown at 73, to a casing 74, against which the loaves of bread, sliding down a chute 72, impinge and open the doors and are discharged from the oven.

76 indicates a door through which the interior of the baking oven can be examined and 77 indicates a side door through which the interior of the baking chamber can be entered.

78 indicates dampers for the flues.

I claim:—

1. A baking oven having side walls, upper and lower arches between said side walls and forming therewith a baking chamber, an end furnace, auxiliary side furnaces, longitudinal flues above the baking chamber connected with the end furnace, and longitudinal flues below the baking chamber connected with the side furnaces.

2. A baking oven having side walls, upper and lower arches between said side walls and forming therewith a baking chamber, an end furnace, auxiliary side furnaces, longitudinal flues above the baking chamber connected with the end furnace, and longitudinal flues above and below the baking chamber connected with the side furnaces.

3. A baking oven having side walls, upper and lower arches between said side walls and forming therewith a baking chamber, an end furnace, auxiliary side furnaces, longitudinal flues above the baking chamber connected with the end furnace, longitudinal flues below the baking chamber connected with the side furnaces, and longitudinal flues above the first-named flues and communicating with the baking chamber.

4. A baking oven having side walls, upper and lower arches between said side walls and forming therewith a baking chamber, an end furnace, auxiliary side furnaces, longitudinal flues above the baking chamber connected with the end furnace, longitudinal flues below the baking chamber connected with the side furnaces, longitudinal flues above the first-named flues and communicating with the baking chamber, said upper and lower longitudinal flues extending first from one end to the other at the sides and then back again in the middle, and a chimney communicating with said flues at the latter ends.

In testimony whereof I have hereunto set my hand in the presence of two subscribing witnesses.

JOHN LARRABURU.

Witnesses:
F. M. WRIGHT,
D. B. RICHARDS.